(12) United States Patent
Watanabe

(10) Patent No.: US 7,157,695 B2
(45) Date of Patent: Jan. 2, 2007

(54) OPTICAL DEFLECTION DEVICE INCLUDING AN OPTICAL DEFLECTION SURFACE HAVING CONTROLLABLE ATTITUDE AND CONTROL METHOD THEREOF

(75) Inventor: Koichiro Watanabe, Tachikawa (JP)

(73) Assignee: Olympus Corporation, Tokyo (JP)

( * ) Notice: Subject to any disclaimer, the term of this patent is extended or adjusted under 35 U.S.C. 154(b) by 261 days.

(21) Appl. No.: 10/807,100

(22) Filed: Mar. 23, 2004

(65) Prior Publication Data

US 2004/0188592 A1    Sep. 30, 2004

(30) Foreign Application Priority Data

Mar. 27, 2003    (JP)    ............................. 2003-088516

(51) Int. Cl.
*G01J 5/02*    (2006.01)
*H04B 10/00*    (2006.01)

(52) U.S. Cl. ...................... 250/234; 250/205; 359/223; 398/122

(58) Field of Classification Search ........ 250/234–236, 250/205; 359/197, 223, 578, 726; 398/212, 398/213
See application file for complete search history.

(56) References Cited

U.S. PATENT DOCUMENTS 5,594,580 A * 1/1997 Sakanaka et al. ........... 398/122

6,335,811 B1 * 1/2002 Sakanaka .................... 398/129

FOREIGN PATENT DOCUMENTS

WO    WO 01/95013 A2    12/2001

OTHER PUBLICATIONS

R. Sawada et al., "8th Chapter Design and Simulation of Optical Micromachine", Nov. 2002, pp. 159.

* cited by examiner

*Primary Examiner*—Stephone B. Allen
(74) *Attorney, Agent, or Firm*—Scully, Scott, Murphy & Presser, P.C.

(57) ABSTRACT

An optical deflection device has a movable mirror including a mirror portion to deflect a light beam, a driver, which drives the movable mirror, a control circuit, which generates a control signal to control the driver, a light intensity detector, which outputs a light intensity signal corresponding to light intensity of the light beam deflected by the movable mirror, a light intensity monitor circuit, which monitors a change with time of the light intensity signal output to output information on the change as a light intensity monitor signal, and a control signal monitor circuit, which monitors a change with time of the control signal to output information on the change as a control signal monitor signal. The control circuit generates the control signal to increase the output signal from the light intensity detector based on the light intensity monitor signal and control signal monitor signal.

9 Claims, 7 Drawing Sheets

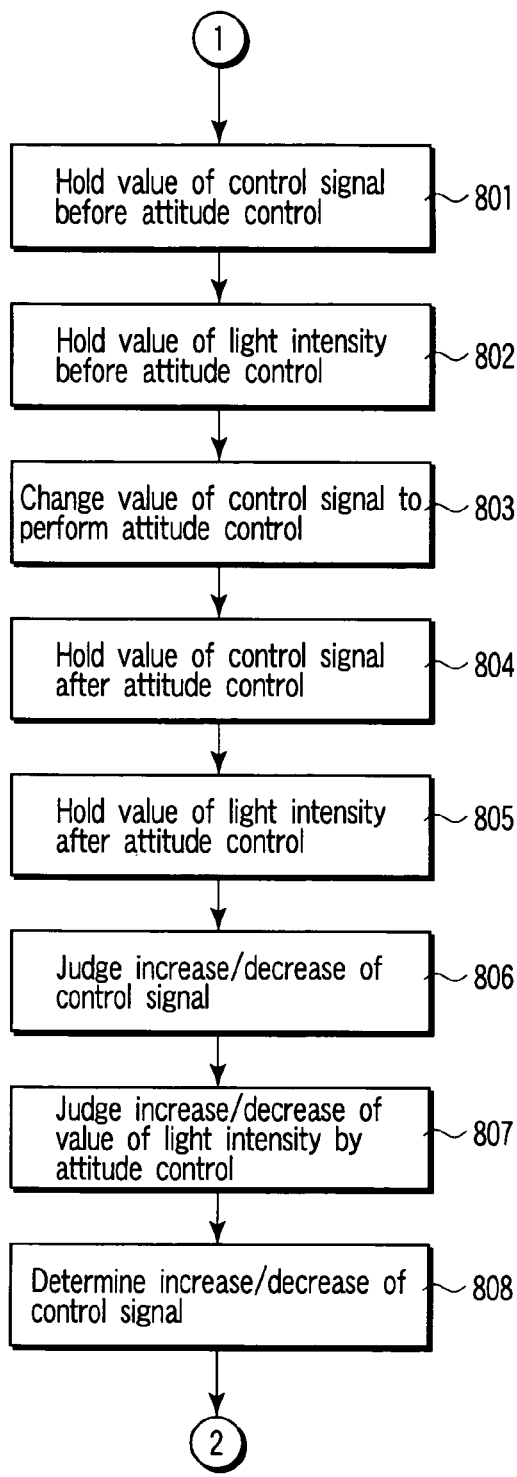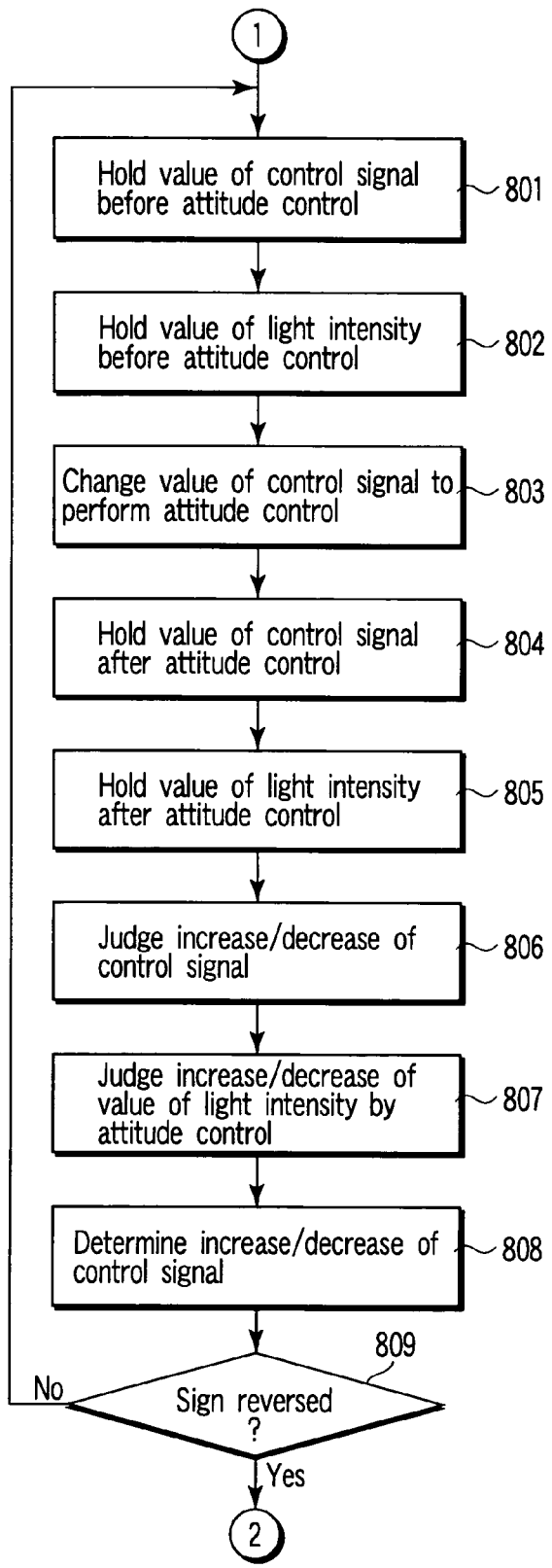
FIG. 9
FIG. 10

OPTICAL DEFLECTION DEVICE INCLUDING AN OPTICAL DEFLECTION SURFACE HAVING CONTROLLABLE ATTITUDE AND CONTROL METHOD THEREOF

CROSS-REFERENCE TO RELATED APPLICATIONS

This application is based upon and claims the benefit of priority from prior Japanese Patent Application No. 2003-088516, filed Mar. 27, 2003, the entire contents of which are incorporated herein by reference.

BACKGROUND OF THE INVENTION

1. Field of the Invention

The present invention relates to an optical deflection device, which controls a deflection direction of a light beam using a movable mirror. The present invention also relates to an optical switch, which controls couplings among optical fibers using the optical deflection device.

2. Description of the Related Art

An optical switch comprising movable mirrors, collimator lenses, input/output optical fibers and the like is described in WO01/95013A2. In the optical switch, a control for optimizing attitudes of movable mirrors related to a selected input/output path is executed as follows. First, the movable mirrors are driven based on a predetermined driving pattern, optical power of light in each driving signal is sampled, and a relation between the driving signal and the optical power of light is approximately calculated so as to obtain a curve. Next, the driving signal at a time when the optical power of light is maximized is estimated from the obtained approximate curve, and the movable mirrors are driven by the driving signal.

The method of controlling the attitudes of the movable mirrors described in WO01/95013A2 requires an operation of obtaining the approximate curve indicating the relation between the attitudes of the movable mirrors and the optical power of light to estimate the attitudes of the movable mirrors by which the optical power of light is maximized from the obtained approximate curve. To obtain the approximate curve, it is necessary to drive the movable mirrors in a comparatively broad range including the attitudes for maximizing the optical power of light and to sample the optical power of light.

For example, in U.S. Pat. No. 6,335,811, a method is described in which the attitude of the movable mirror after micro movement is maintained with the increase of the optical power of light by the micro movement of the movable mirror, the attitude is returned to that before the micro movement with the decrease of the optical power of light by the micro movement of the movable mirror, and these operations are repeated about each driving axis of the movable mirror. In this method, the movable mirror is repeatedly micro-moved in a predetermined order with respect to several predetermined directions.

BRIEF SUMMARY OF THE INVENTION

The present invention is, in an aspect, directed to an optical deflection device capable of controlling an attitude of a movable mirror at a high speed.

The optical deflection device of the present invention comprises: a movable mirror including a mirror portion, whose attitude is controllable, to deflect a light beam; a driver, which drives the movable mirror; a control circuit, which generates a control signal to control the driver; a light intensity detector, which outputs a light intensity signal corresponding to light intensity of the light beam deflected by the movable mirror; a light intensity monitor circuit, which monitors a change with time of the light intensity signal output from the light intensity detector to output information on the change as a light intensity monitor signal; and a control signal monitor circuit, which monitors a change with time of the control signal output from the control circuit to output information on the change as a control signal monitor signal. The control circuit generates the control signal to increase the output signal from the light intensity detector based on the light intensity monitor signal and control signal monitor signal.

The present invention is, in another aspect, directed to an optical switch capable of switching a light signal at a high speed.

The optical switch of the present invention comprises: an input optical fiber; output optical fibers; a movable mirror including a mirror portion, whose attitude is controllable, to direct a light beam projected from the input optical fiber to one of the output optical fibers; a driver, which drives the movable mirror; a control circuit, which generates a control signal to control the driver; light intensity detectors, which output light intensity signals corresponding to light intensities of the light beams coupled with the output optical fibers; a light intensity monitor circuit, which monitors changes with time of the light intensity signals output from the light intensity detectors to output information on the changes as a light intensity monitor signal; and a control signal monitor circuit, which monitors a change with time of the control signal output from the control circuit to output information on the change as a control signal monitor signal. The control circuit generates the control signal to increase output signals from the light intensity detectors based on the light intensity monitor signal and control signal monitor signal.

The present invention is, in another aspect, directed to a control method in which an attitude of an optical deflection surface is controlled at a high speed.

The control method of the present invention comprises: a setting step of setting an attitude of the optical deflection surface based on a control signal; a holding step of holding the control signal and light intensity corresponding to the control signal; and a generation step of generating a new control signal, these steps being repeatedly executed. The generation step generates the control signal to bring the light intensity close to a maximum intensity based on a change of the control signal and a change of the light intensity synchronized with the change of the control signal, which are obtained by execution of a plurality of holding steps.

Another control method of the present invention comprises: generating a control signal to control the optical deflection surface to deflect a light beam in a target attitude; continuing to detect light intensity of the light beam deflected by the optical deflection surface; and continuing to change the control signal so as to increase the light intensity based on a change of the light intensity in response to the change of the control signal.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 9 is a flowchart showing an attitude control operation of steps 82 to 85 shown in FIG. 8;

FIG. 10 is a flowchart showing another attitude control operation of the steps 82 to 85 shown in FIG. 8;

DETAILED DESCRIPTION OF THE INVENTION

Embodiments of the present invention will be described hereinafter with reference to the drawings.

First Embodiment

Figure 1:
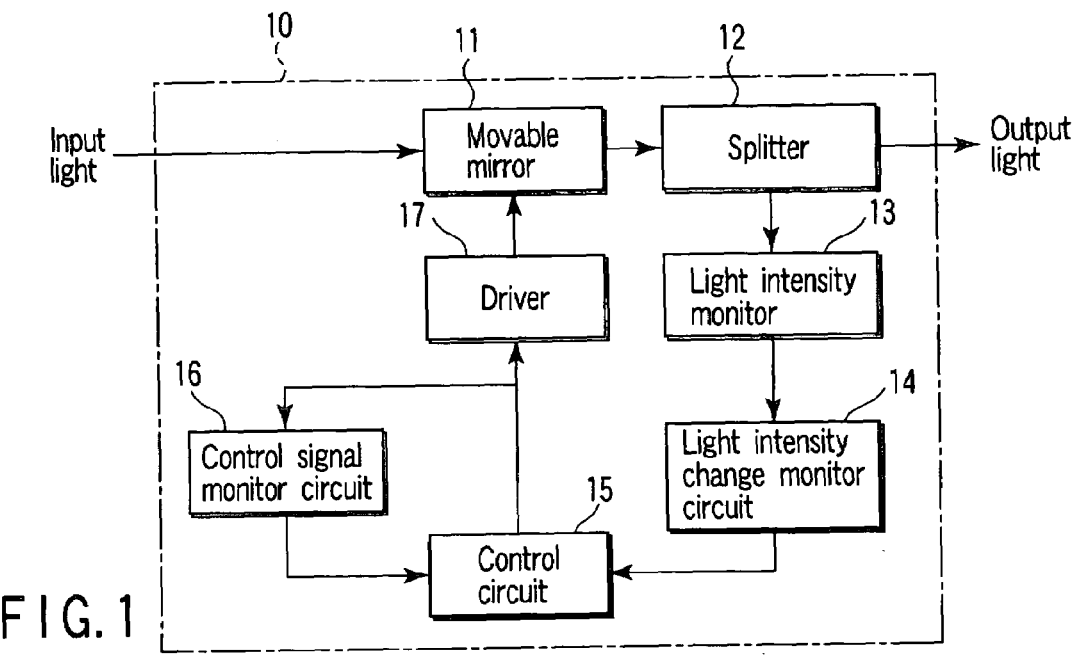
FIG. 1 shows a constitution of an optical deflection device according to a first embodiment of the present invention.

A constitution of an optical deflection device 10 of a first embodiment of the present invention will be described with reference to FIG. 1.

The optical deflection device 10 comprises: a movable mirror (optical deflector) 11 including an optical deflection surface, whose attitude is controllable; a driver 17, which drives the movable mirror 11; a control circuit (control means) 15, which generates a control signal to control the driver 17; a splitter (light splitting means) 12, which splits a light beam deflected by the movable mirror 11; a light intensity monitor 13, which outputs a light intensity signal corresponding to light intensity of the light beam output from the splitter 12; a light intensity change monitor circuit (light intensity monitor means) 14, which monitors a change with time of the light intensity signal output from the light intensity monitor 13 to output information on the change as a light intensity monitor signal; and a control signal monitor circuit (control signal monitor means) 16, which monitors a change with time of the control signal output from the control circuit 15 to output information on the change as a control signal monitor signal.

The splitter 12 and light intensity monitor 13 constitute a light intensity detector that outputs a light intensity signal corresponding to light intensity of the light beam deflected by the movable mirror 11.

Next, an operation of the optical deflection device 10 in the present embodiment will be described.

The control circuit 15 first outputs the control signal to control the optical deflection surface of the movable mirror 11 in a target attitude to the control signal monitor circuit 16 and driver 17.

The driver 17 converts the input control signal to a driving signal to drive the movable mirror 11 to output the driving signal to the movable mirror 11. The movable mirror 11 changes the attitude of the optical deflection surface in accordance with the input driving signal.

The light beam input into the optical deflection device 10 is deflected by the movable mirror 11. The light beam deflected by the movable mirror 11 is split into two by the splitter 12. One of the split light beams is output from the optical deflection device 10, and the other light beam is input as a monitor light into the light intensity monitor 13. The light intensity monitor 13 outputs the light intensity signal, which is proportional to the light intensity of the monitor light to the light intensity change monitor circuit 14.

The control circuit 15 subsequently outputs the control signal obtained by slightly changing the previously output control signal to the control signal monitor circuit 16 and driver 17.

The control signal monitor circuit 16 outputs the control signal monitor signal corresponding to the change of the control signal to the control circuit 15 based on two continuous control signals output from the control circuit 15. The light intensity change monitor circuit 14 outputs the light intensity monitor signal corresponding to the change of the light intensity signal to the control circuit 15 based on two continuous light intensity signals output from the light intensity monitor 13 in response to two continuous control signals.

The control circuit 15 subsequently generates the control signal to increase the light intensity signal based on the light intensity monitor signal and control signal monitor signal.

Next, the generation of the control signal, which increases the light intensity signal, will be described with reference to FIGS. 2 and 3.

Figure 2:
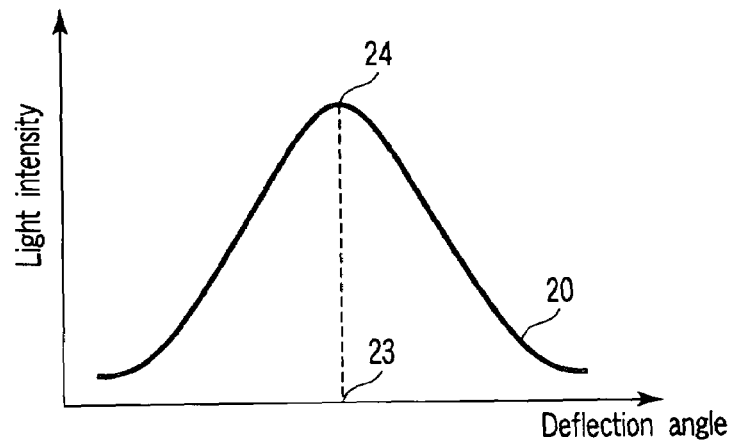
FIG. 2 shows a change pattern of intensity of light with respect to a deflection angle of a movable mirror shown in FIG. 1.

FIG. 2 shows a change pattern 20 of the intensity of light with respect to a deflection angle of the movable mirror 11. As shown in FIG. 2, the change pattern 20 of the intensity of light has a maximum value 24 for a deflection angle 23 of the movable mirror 11. It is to be noted that the deflection angle of the movable mirror 11 in the deflection angle 23 is not necessarily 0 degree.

Figure 3:
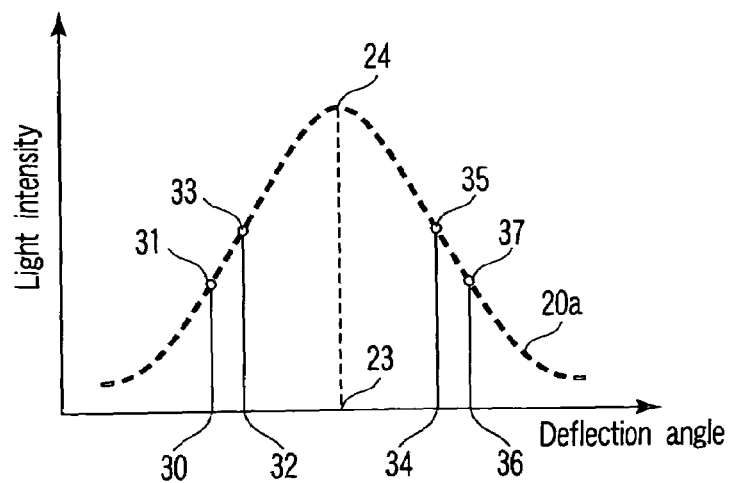
FIG. 3 schematically shows a change of the intensity of light with respect to actual deflection of the movable mirror shown in FIG. 1.

FIG. 3 schematically shows the change of the intensity of light with respect to actual deflection of the movable mirror 11. In FIG. 3, the intensity of light has a light intensity value 31 for a deflection angle 30 of the movable mirror 11, a light intensity value 33 for a deflection angle 32, a light intensity value 35 for a deflection angle 34, and a light intensity value 37 for a deflection angle 36. A change pattern 20a of the light intensity shown by a broken line indicates that values other than the light intensity values 31, 33, 35, 37 are not known.

When the deflection angle of the movable mirror 11 is smaller than the deflection angle 23, and when the movable mirror 11 is varied, for example, to the deflection angle 32 from the deflection angle 30, the light intensity increases to the light intensity value 33 from the light intensity value 31.

On the other hand, when the deflection angle of the movable mirror 11 is larger than the deflection angle 23, and when the movable mirror 11 is changed to the deflection angle 36 from the deflection angle 34, the light intensity decreases to the light intensity value 37 from the light intensity value 35.

The operation of judging the increase/decrease of the control signal will be described with reference to FIG. 3.

For example, when the deflection angle of the movable mirror 11 is increased to the deflection angle 32 from the deflection angle 30, the light intensity increases to the light intensity value 33 from the light intensity value 31. Since the light intensity increases with the increase of the deflection angle, it can be judged that the deflection angle of the movable mirror 11 is smaller than the deflection angle 23 imparting a maximum value 24 of the change pattern 20a of the light quantity. Therefore, it can be judged that there is a possibility of further increase of the light quantity, when the deflection angle of the movable mirror 11 is increased from the existing angle.

On the other hand, when the deflection angle of the movable mirror 11 is increased to the deflection angle 36 from the deflection angle 34, the light intensity decreases to the light intensity value 37 from the light intensity value 35. When the light intensity decreases in response to the increase of the deflection angle, the deflection angle of the movable mirror 11 can be judged to be larger than the deflection angle 23 imparting the maximum value 24 of the change pattern 20a of the intensity of light. Therefore, it can be judged that there is a possibility of the increase of the light quantity, when the existing deflection angle of the movable mirror 11 is decreased.

It is to be noted that this also applies to the judgment at a time when the deflection angle is decreased.

From the above, when the following controls (a) to (d) are performed, it is possible to bring the deflection angle of the movable mirror 11 close to the deflection angle 23 imparting the maximum value 24 of the intensity of light.

(a) If the intensity of light increases when the deflection angle is increased, the control signal that increases the existing deflection angle is generated.

(b) If the intensity of light decreases when the deflection angle is increased, the control signal that decreases the existing deflection angle is generated.

(c) If the intensity of light increases when the deflection angle is decreased, the control signal that decreases the existing deflection angle is generated.

(d) If the intensity of light decreases when the deflection angle is decreased, the control signal that increases the existing deflection angle is generated.

Concrete constitutions and operations of the light intensity change monitor circuit 14 and control signal monitor circuit 16 will be described with reference to FIG. 4.

The control signal monitor circuit 16 comprises: a memory (control signal holding section) 41, which holds the control signal output from the control circuit 15; a memory (control signal holding section) 42, which holds the control signal output from the control circuit 15 immediately before the control signal held in the memory 41; and a subtraction circuit (control signal comparison section) 43, which obtains a difference between the control signals held in the memories 41 and 42.

The light intensity change monitor circuit 14 comprises: a memory (light intensity signal holding section) 44, which holds the light intensity signal at a time when the movable mirror 11 is driven by the control signal held in the memory 41; a memory (light intensity holding section) 45, which holds the light intensity signal at a time when the movable mirror 11 is driven by the control signal held in the memory 42; and a subtraction circuit (light intensity signal comparison section) 46, which obtains a difference between the light intensity signals held in the memories 44 and 45.

The control circuit 15 outputs the control signal to the driver 17 and memory 41. The memory 41 outputs the control signal held until that time to the memory 42, and holds a newly input control signal. The memory 42 discards the control signal held until that time, and holds the newly input control signal. The subtraction circuit 43 obtains the difference between the control signals held in the memories 41 and 42, and outputs the signal corresponding to the difference to the control circuit 15. The subtraction circuit 43 may output a signal of the difference of the control signals or a signal having a sign corresponding to the difference. The control circuit 15 judges the increase/decrease of the control signal from the output of the subtraction circuit 43.

The driver 17 converts the newly input control signal to the driving signal to output the signal to the movable mirror 11. The movable mirror 11 changes the attitude of the deflection surface in accordance with the newly input driving signal. As a result, the light intensity signal output from the light intensity monitor 13 changes.

The light intensity monitor 13 outputs the light intensity signal to the memory 44. The memory 44 outputs the light intensity signal held until that time to the memory 45, and holds the light intensity signal newly input from the light intensity monitor 13. The memory 45 discards the light intensity signal held until that time, and holds the newly input light intensity signal. The subtraction circuit 46 obtains the difference between the light intensity signals held in the memories 44 and 45, and outputs the signal corresponding to the difference to the control circuit 15. The subtraction circuit 46 may output a signal of the difference itself between the light intensity signals or a signal corresponding to the sign corresponding to the difference. The control circuit 15 judges the increase/decrease of the light intensity signal from the output of the subtraction circuit 46.

Figure 5:
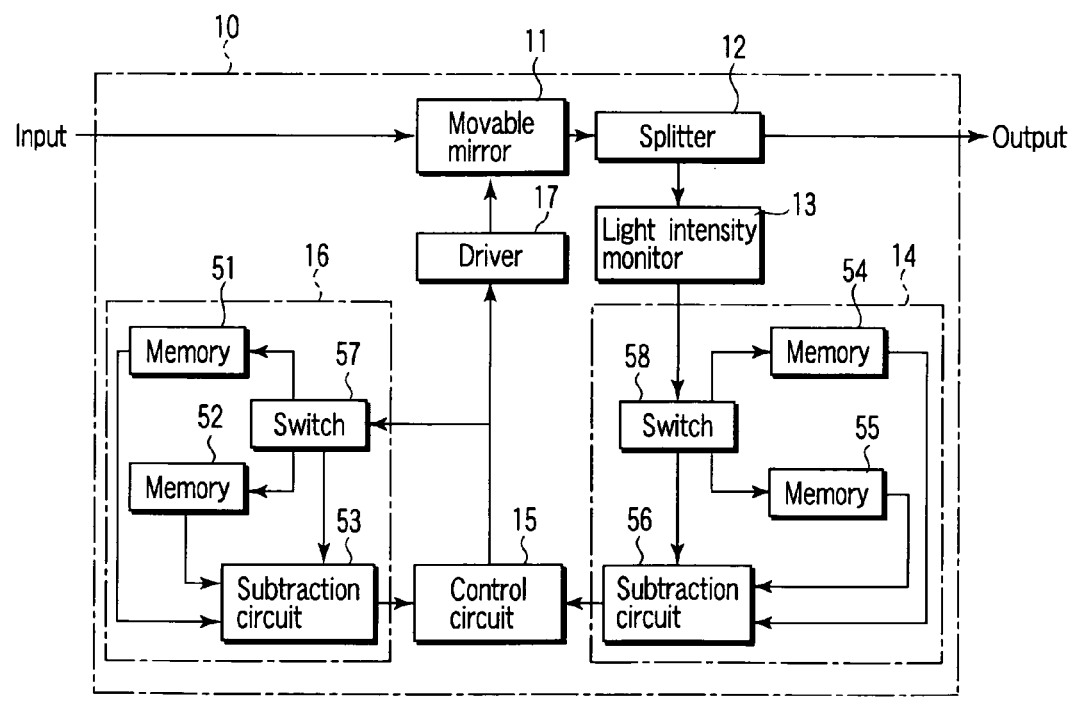
FIG. 5 shows a constitution of the optical deflection device of FIG. 1, especially other concrete constitutions of the light intensity change monitor circuit and control signal monitor circuit.

Next, other concrete constitutions and-operations of the light intensity change monitor circuit 14 and control signal monitor circuit 16 with reference to FIG. 5.

The control signal monitor circuit 16 comprises: two memories (control signal holding sections) 51 and 52, which hold the control signal output from the control circuit 15; a subtraction circuit (control signal comparison section) 53, which obtains the difference between the control signals held in the memories 51 and 52; and a switch 57, which alternately switches and sends the input control signal to the memories 51 and 52.

The light intensity change monitor circuit 14 comprises: two memories (light intensity holding sections) 54 and 55, which hold the light intensity signal output from the light intensity monitor 13; a subtraction circuit (light intensity signal comparison section) 56, which obtains the difference between the control signals held in the memories 54 and 55; and a switch 58, which alternately switches and sends the input light intensity signal to the memories 54 and 55.

A switch timing of the switch 57 is synchronized with that of the switch 58, and the switching is performed, for example, in accordance with a synchronous signal output from the control circuit 15.

The control circuit 15 outputs the control signal to the driver 17 and switch 57. The switch 57 alternately sends the control signal to one of the memories 51 and 52, and outputs a signal concerning a time relation between the control signals held in the memories 51 and 52 to the subtraction circuit 53. The memories 51 and 52 hold the newly input control signals, and discard the control signals held until that time. The subtraction circuit 53 subtracts the control signal old in time from the control signal new in time based on the control signal held in the memories 51 and 52 and the signal concerning the time relation between the control signals input from the switch 57, and outputs the signal corresponding to the difference to the control circuit 15. The subtraction circuit 53 may output the signal of the difference itself between the control signals or the signal of the sign corresponding to the difference. The control circuit 15 judges the increase/decrease of the control signal from the output of the subtraction circuit 53.

The driver 17 converts the newly input control signal to the driving signal to output the signal to the movable mirror 11. The movable mirror 11 changes the attitude of the deflection surface in accordance with the newly input driving signal. As a result, the light intensity signal output from the light intensity monitor 13 changes.

The light intensity monitor 13 outputs the light intensity signal to the switch 58. The switch 58 alternately sends the light intensity signal to one of the memories 54 and 55, and outputs the signal concerning the time relation between the light intensity signals held in the memories 54 and 55 to the subtraction circuit 56. The memories 54 and 55 hold the newly input light intensity signals, and discard the light intensity signals held until that time. The subtraction circuit 56 subtracts the light intensity signal old in time from that new in time based on the light intensity signals held in the memories 54 and 55 and the signal concerning the time relation between the light intensity signals input from the switch 58, and outputs the signal corresponding to the difference to the control circuit 15. The subtraction circuit 56 may output the signal of the difference itself between the light intensity signals or the signal of the sign corresponding to the difference. The control circuit 15 judges the increase/decrease of the light intensity signal from the output of the subtraction circuit 56.

Next, the concrete constitution and operation of the control circuit 15 will be described with reference to FIG. 6.

The control circuit 15 comprises: a logic circuit (judgment signal output section) 65, which outputs information indicating whether to maintain or reverse the increase/decrease of the control signal as a judgment signal based on the control signal monitor signal from the control signal monitor circuit 16 and the light intensity monitor signal from the light intensity change monitor circuit 14; and a control signal update section 64, which generates the control signal based on the judgment signal.

The logic circuit 65 outputs the judgment signal to maintain the increase/decrease of the control signal when the light intensity signal increases in response to the increase/decrease of the control signal, and outputs the judgment signal to reverse the increase/decrease of the control signal when the light intensity signal decreases in response to the increase/decrease of the control signal.

The control signal update section 64 comprises: a signal holding circuit (signal holding section) 61, which holds a latest control signal; a signal generator (increase/decrease signal generation section) 62, which generates an increase/decrease signal indicating an increase/decrease amount of the control signal; and an addition/subtraction circuit (calculation section) 63, which adds or subtracts the control signal output from the signal holding circuit 61 and the increase/decrease signal output from the signal generator 62 based on the judgment signal input from the logic circuit 65.

The addition/subtraction circuit 63 adds or subtracts the output signals of the signal holding circuit 61 and signal generator 62 in accordance with the judgment signal from the logic circuit 65 for each timing at which the attitude of the movable mirror 11 is changed, and outputs the results as the control signals to the signal holding circuit 61 and driver 17. The signal holding circuit 61 discards the control signal held until that time, and holds the newly input control signal as the latest control signal. The signal generator 62 outputs the increase/decrease signal, which determines the change amount of the deflection angle of the movable mirror 11 in one attitude control.

The increase/decrease signal output from the signal generator 62 is variable. For example, when the light intensity is small, the increase/decrease signal may be increased to increase the change amount of the deflection angle. On the other hand, when the light intensity is large, the increase/decrease signal may be reduced to reduce the change amount of the deflection angle.

The logic circuit 65 comprises, for example, XOR and NOT. The logic circuit 65 outputs the judgment signal to instruct addition to the addition/subtraction circuit 63, when the outputs of the light intensity change monitor circuit 14 and control signal monitor circuit 16 have the same polarity (positive/negative coincident). The logic circuit outputs the judgment signal to instruct the subtraction to the addition/subtraction circuit 63, when the output signals of the light intensity change monitor circuit 14 and control signal monitor circuit 16 have different polarities (positive/negative different).

Figure 4:
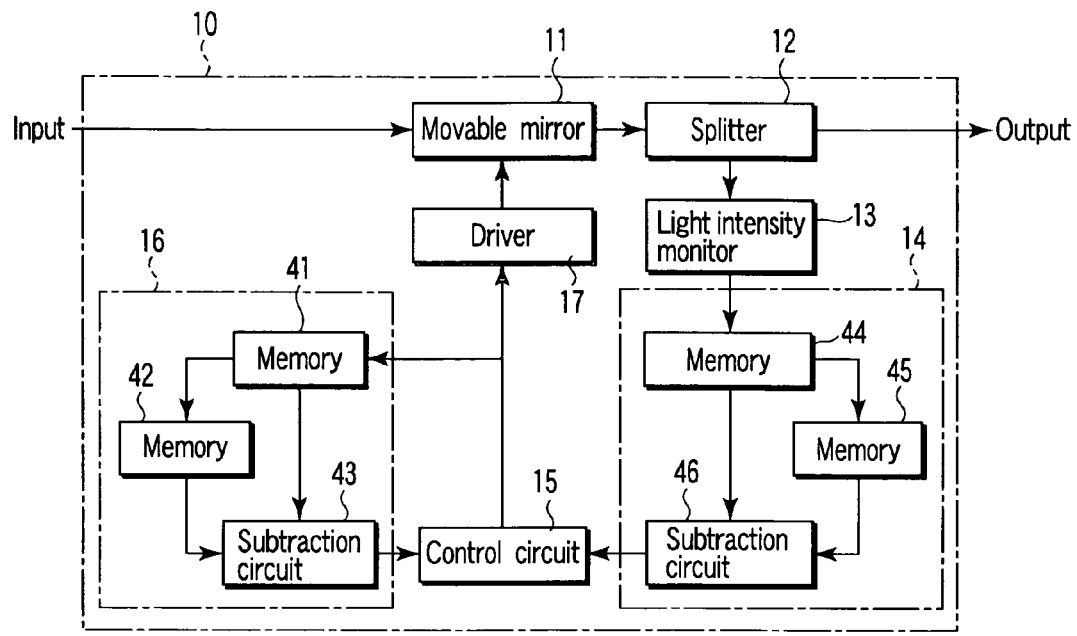
FIG. 4 shows a constitution of the optical deflection device of FIG. 1, especially concrete constitutions of a light intensity change monitor circuit and control signal monitor circuit.
Figure 6:
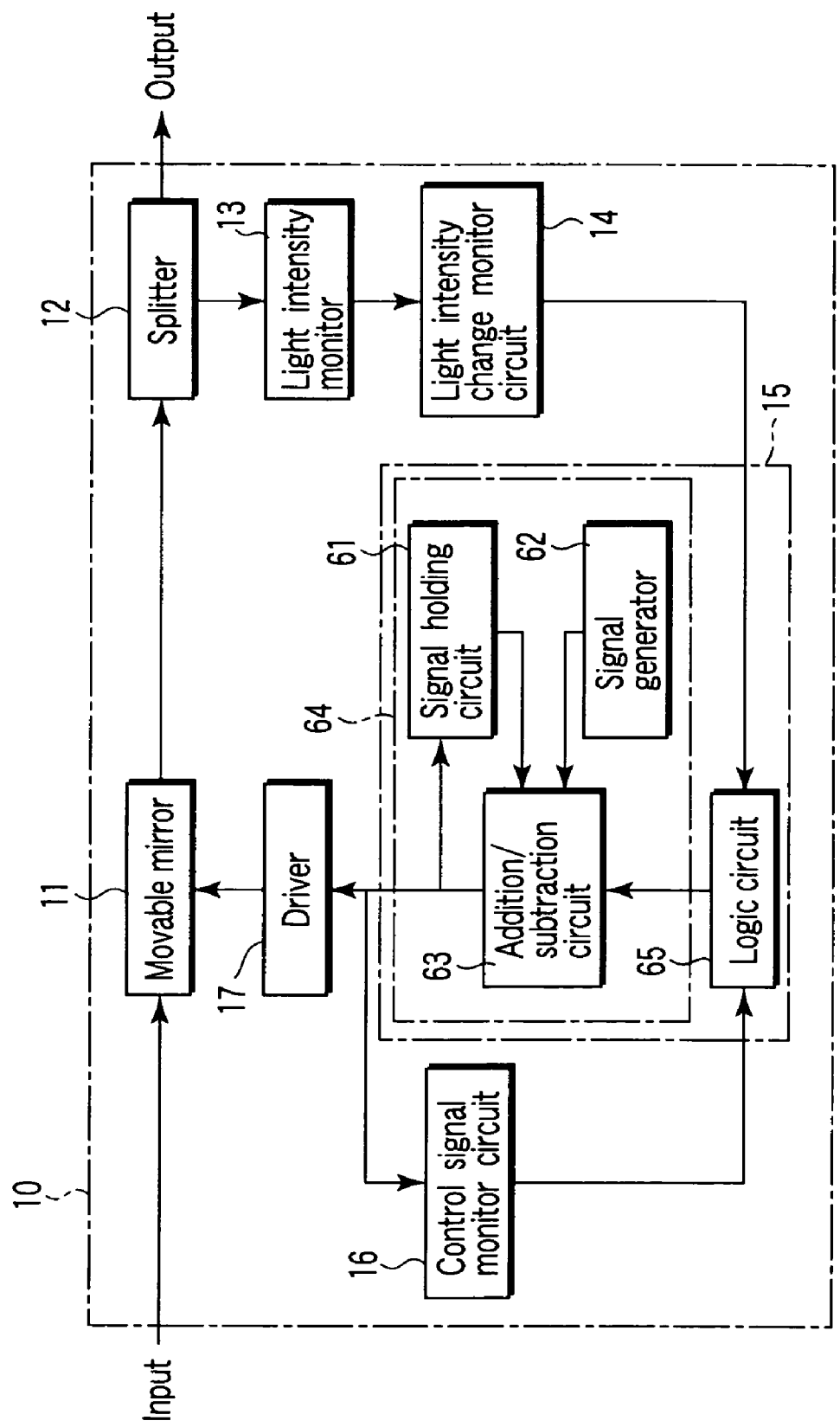
FIG. 6 shows a constitution of the optical deflection device of FIG. 1, especially the concrete constitution of a control circuit.

The control circuit 15 shown in FIG. 6 may also be combined with the light intensity change monitor circuit 14 and control signal monitor circuit 16 shown in FIG. 4 or 5.

According to the optical deflection device of the present embodiment, the attitude to increase the light intensity is estimated, so that the control signal that increases the light intensity signal is generated based on the changes of the control signal and light intensity signal. Therefore, the deflection surface of the movable mirror 11 is controlled in an optimum attitude by a small number of changes of the deflection angle. That is, the optical deflection surface of the movable mirror 11 is directed in an optimum direction without being repeatedly directed in an inappropriate direction many times. Accordingly, reliability of attitude control of the optical deflection surface is enhanced.

The first embodiment may variously be altered or modified. For example, since the attitude of the movable mirror 11 is uniquely determined by the control signal output from the control circuit 15, the increase/decrease of the driving signal output from the driver 17 may also be monitored instead of monitoring the control signal. Moreover, a sensor that detects the information concerning the attitude of the movable mirror 11 may be added so that increase/decrease of an output of the sensor is monitored.

Second Embodiment

A second embodiment of the present invention will be described. The present embodiment is directed to an optical switch, in which the optical deflection device of the first embodiment is used.

Figure 7:
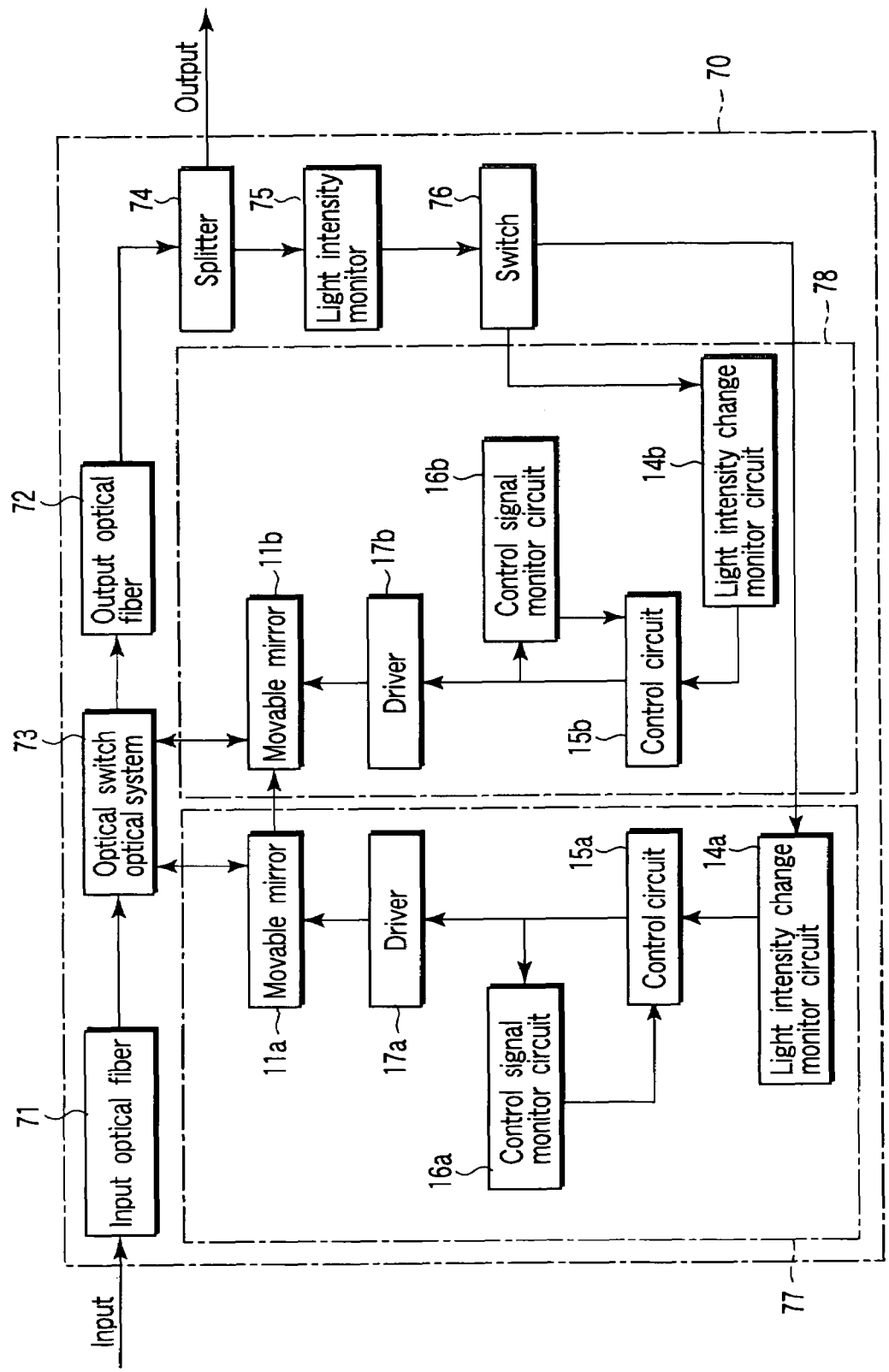
FIG. 7 shows a constitution of an optical switch according to a second embodiment of the present invention.

The optical switch of the present embodiment will be described with reference to FIG. 7.

An optical switch 70 of the present embodiment comprises: at least one input lens-mounted optical fiber 71; output lens-mounted optical fibers 72; an optical deflection device 77 including a movable mirror 11a; another optical deflection device 78 including a movable mirror 11b; an optical switch optical system 73, which cooperates with the movable mirrors 11a and 11b to direct the light beam projected from the input lens-mounted optical fiber 71 to one of the output lens-mounted optical fibers 72; splitters (optical split means) 74, which individually split some of the light beams input into the output lens-mounted optical fibers 72; light intensity monitors 75, which output the light intensity signals corresponding to the light quantities of the light beams split by the splitters 74; and a switch 76, which selectively sends the light intensity signals output from the light intensity monitors 75 to one of the optical deflection devices 77 and 78.

The splitters 74 and light intensity monitors 75 constitute light intensity detectors that output the light intensity signals corresponding to the light intensity of the light beams coupled with the output lens-mounted optical fibers 72.

Both the optical deflection devices 77 and 78 have the constitution similar to that of the optical deflection device 10 of the first embodiment. In more detail, both the optical deflection devices 77 and 78 have the constitution in which the splitter 12 and light intensity monitor 13 are omitted from the optical deflection device 10 of the first embodiment.

Therefore, the optical deflection device 77 comprises: the movable mirror (optical deflector) 11a having the optical deflection surface, whose attitude 1is controllable; a driver 17a, which drives the movable mirror 11a; a control circuit (control means) 15a, which generates the control signal to control the driver 17a; a light intensity change monitor circuit (light intensity monitor means) 14a, which monitors the change of the light intensity signal output from the switch 76 to output the information on the change as the light intensity monitor signal; and a control signal monitor circuit (control signal monitor means) 16a, which monitors the change of the control signal output from the control circuit 15a to output information on the change as the control signal monitor signal. The control circuit 15a generates the control signal based on the light intensity monitor signal and control signal monitor signal.

Similarly, the optical deflection device 78 comprises: a movable mirror (optical deflector) 11b having the optical deflection surface, whose attitude is controllable; a driver 17b, which drives the movable mirror 11b; a control circuit (control means) 15b, which generates the control signal to control the driver 17b; a light intensity change monitor circuit (light intensity monitor means) 14b, which monitors the change of the light intensity signal input from the switch 76 to output the information on the change as the light intensity monitor signal; and a control signal monitor circuit (control signal monitor means) 16b, which monitors the change of the control signal output from the control circuit 15b to output information on the change as the control signal monitor signal. The control circuit 15b generates the control signal based on the light intensity monitor signal and control signal monitor signal.

The detailed constitutions and operations of the respective components of the optical deflection devices 77 and 78 are substantially the same as those of the optical deflection device 10 of the first embodiment.

Figure 8:
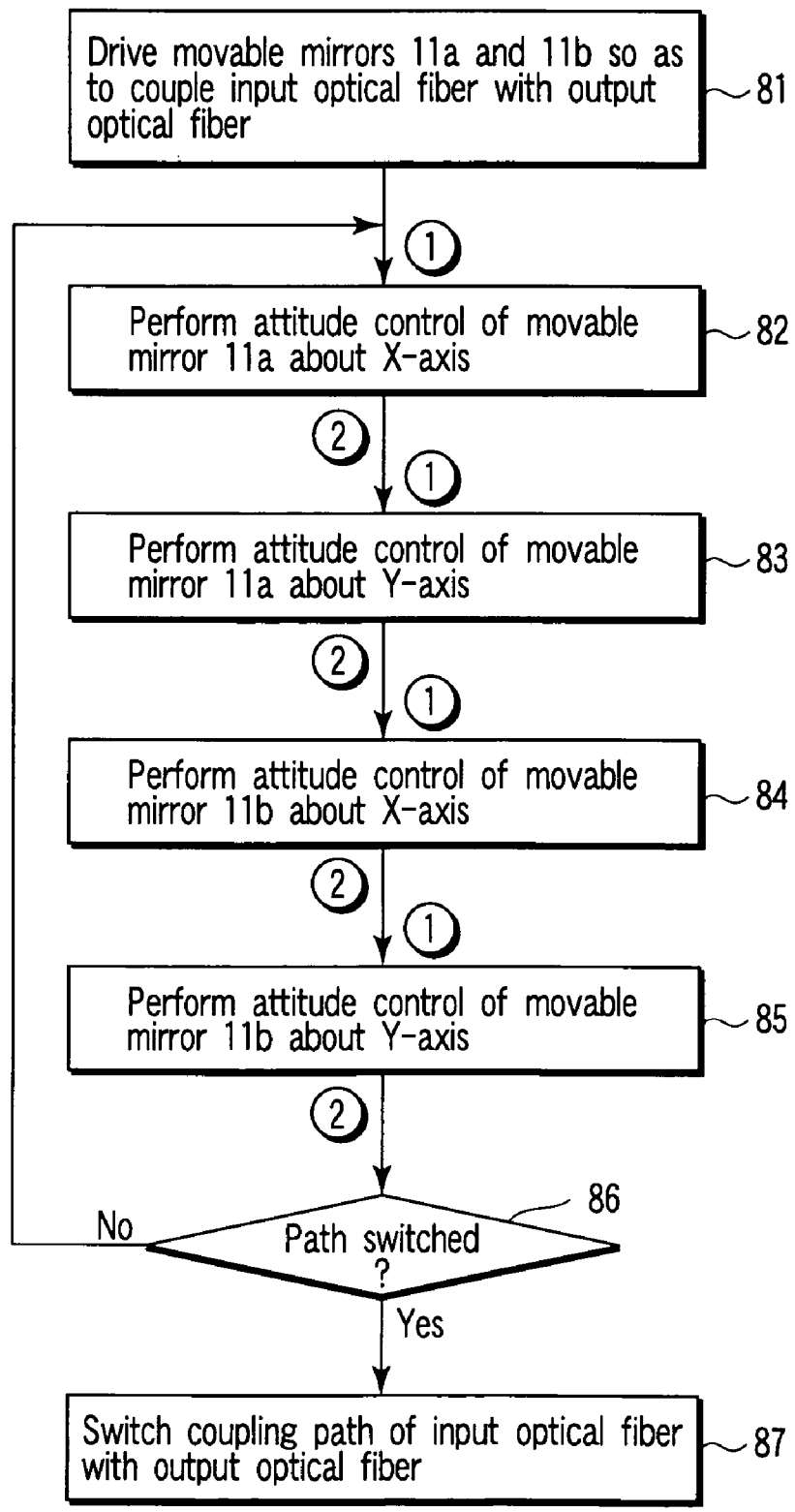
FIG. 8 is a flowchart showing an operation of the optical switch shown in FIG. 7.

Next, the operation of the optical switch of the present embodiment will be described with reference to FIG. 8. In step 81, the movable mirrors 11a and 11b are deflected so as to couple the input lens-mounted optical fiber 71 with a target output lens-mounted optical fiber 72. In step 82, attitude control of the movable mirror 11a about an X-axis is performed. In step 83, the attitude control of the movable mirror 11a about a Y-axis is performed. In step 84, attitude control of the movable mirror 11b about the X-axis is performed, and in step 85, the attitude control of the movable mirror 11b about the Y-axis is performed. In step 86, it is judged whether to switch a coupling path of the input lens-mounted optical fiber 71 with the output lens-mounted optical fibers 72. When the path is maintained, the process returns to the step 82. When the path is judged to be switched, the path is switched in the step 87.

The attitude control operation of steps 82 to 85 will be described with reference to FIG. 9. In the following description, the movable mirrors 11a and 11b are represented by the movable mirror 11. In step 801, the control signal before the deflection is held, and in step 802, the light intensity before the deflection is held. Next, in step 803, the control signal is changed to deflect the movable mirror 11. In step 804, the control signal after the deflection is held, and in step 805, the light intensity after the deflection is held. Next in step 806, the increase/decrease of the control signal is judged from the control signals obtained in the steps 801 and 804. Next in step 807, the increase/decrease of the light intensity is judged from the light quantities obtained in the steps 802 and 805. Next in step 808, it is judged whether to increase or decrease the control signal in the next step 803 to deflect the movable mirror 11 from judgment results of the step 806 of obtaining the increase/decrease of the control signal and the step 807 of obtaining the increase/decrease of the light quantity.

In the attitude control, for example, when there are a larger number of movable mirrors required for coupling the input lens-mounted optical fiber 71 with the output lens-mounted optical fibers 72, this can easily be handled by increasing the steps of the attitude control operation.

Another attitude control operation of the steps 82 to 85 will be described with reference to FIG. 10. The attitude control operation of the steps 801 to 808 is similar to that of FIG. 9. In step 809, detecting a time when the sign to judge whether to increase or decrease the control signal in the step 806 is reversed, it is judged that the light intensity reaches its maximum at the time when the sign is reversed.

In the attitude control operation of FIG. 9, after the attitude control about one axis is performed, the attitude controls about the other three axes are performed until the attitude control is performed again. That is, for example, after performing the attitude control about the X-axis of the movable mirror 11a, the attitude controls about the Y-axis of the movable mirror 11a, and the X-axis and Y-axis of the movable mirror 11b are performed until the attitude control is performed again. Therefore, the attitude control about one axis is influenced by the light intensity change by the attitude controls performed about the other three axes.

On the other hand, in the attitude control operation of FIG. 10, since the attitude control is performed independently for each axis, the light intensity change in response to the attitude control is directly fed back.

In the optical switch of the present embodiment, the optical deflection devices 77 and 78, which control the attitudes of the movable mirrors 11a and 11b, are used to control the direction of the light beam coupled with the target output lens-mounted optical fiber 72 so as to increase the light intensity signal with the attitudes that increases the light intensity being estimated. Therefore, even during the operation of the optical switch, the attitude controls of the movable mirrors 11a and 11b can be performed. Moreover, since the deflection surfaces of the movable mirrors 11a and 11b can be controlled in the optimum attitudes by a small number of changes of the deflection angle, high-speed switching required for the optical switch can be performed.

The present embodiment may variously be modified or altered.

For example, the optical switch of the present embodiment includes two optical deflection devices 77 and 78, but the number is not limited to two. That is, the optical switch may include only one optical deflection device. Alternatively, conversely, the optical switch may also include three or more optical deflection devices.

Moreover, both the input lens-mounted optical fiber 71 and output lens-mounted optical fibers 72 may comprise separate lenses and optical fibers. The optical fibers may be separated or arrayed. The lenses may also be separated or arrayed. Moreover, the input optical fibers and output optical fibers may be of a common array. The optical switch optical system 73 may also include a fixed reflective mirror in addition to the movable mirrors 11a and 11b, or the movable mirrors 11a and 11b may also be positioned on a common movable mirror array.

Further in the attitude control of the movable mirror, the step 86 may be added between the steps 82 and 83, the step 86 may also be added between the steps 83 and 84, or the step 86 may also be added between the steps 84 and 85. The order of the attitude controls about the X-axis and Y-axis may also be reversed, and the order of the attitude controls of the movable mirrors 11a and 11b may also be reversed.

Electrostatic MEMS mirror

The movable mirrors (optical deflectors) in the first and second embodiments comprise, for example, the electrostatic MEMS mirrors. The electrostatic MEMS mirror will hereinafter be described with reference to FIGS. 11 and 12.

Figure 11:
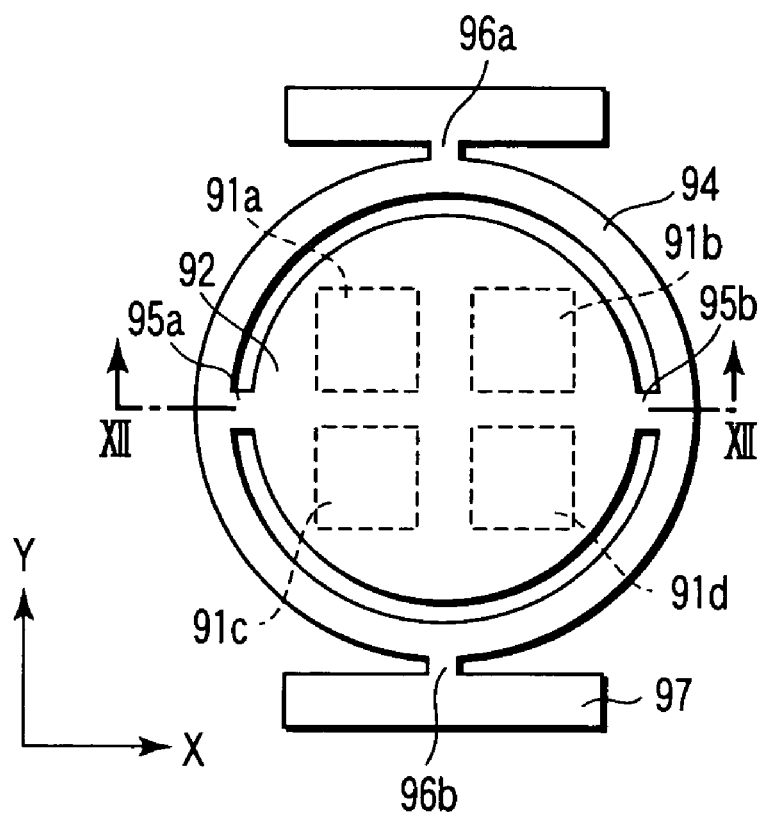
FIG. 11 is a plan view of an electrostatic MEMS mirror applicable as the movable mirrors of FIGS. 1 and 7.
Figure 12:
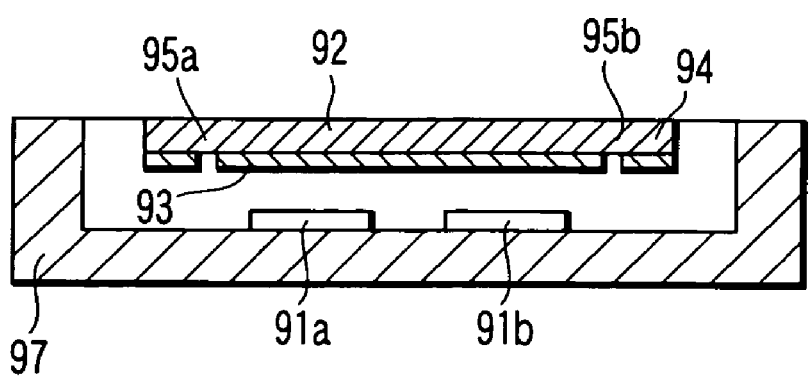
FIG. 12 is a sectional view of the electrostatic MEMS mirror along line XII—XII of FIG. 11.

As shown in FIGS. 11 and 12, the electrostatic MEMS mirror comprises: a mirror portion (optical deflection surface) 92; a mirror support member 94, which surrounds the mirror portion 92; a pair of hinges 95a and 95b, which connect the mirror portion 92 and mirror support member 94; a pair of hinges 96a and 96b, which support the mirror support member 94; a substrate 97, which supports the hinges 96a and 96b, and secures a space for deflecting the mirror portion 92; four independent driving electrodes 91a to 91d disposed on the substrate 97; and a common electrode 93 disposed on the mirror portion 92 so as to face the driving electrodes 91a to 91d.

In the electrostatic MEMS mirror, a bias voltage which is a reference is applied beforehand to four driving electrodes 91a to 91d, and the mirror portion 92 is deflected by application of a driving voltage having a reverse polarity to the bias voltages of the driving electrodes positioned on opposite sides via a driving axis.

Concretely, assuming that the bias voltage is $V_0$, a control voltage for a desired deflection amount about the X-axis is Vx, and the control voltage for the desired deflection amount about the Y-axis is Vy, driving voltages Va, Vb, Vc, Vd applied to four driving electrodes 91a, 91b, 91c, 91d are represented by the following equations:

$$Va = V_0 + (-Vx + Vy)/2;$$

$$Vb = V_0 + (Vx + Vy)/2;$$

$$Vc = V_0 + (-Vx - Vy)/2; \text{ and}$$

$$Vd = V_0 + (Vx - Vy)/2.$$

A method of driving the electrostatic MEMS mirror is described, for example, in a book titled "Optical Micro Machine" (Ohm Co.), page 159, and is a well known technique, and therefore the detailed description is omitted. Vx and Vy take positive/negative values in accordance with the direction of the deflection, take+values, when the mirror portion 92 is deflected clockwise about the axis, and take− values, when the portion is deflected counterclockwise. This driving method is naturally applicable even to the deflection about one axis.

Here, the example in which the movable mirror 11 comprises the electrostatic MEMS mirror has been described, but the movable mirror 11 is not limited to this. For example, the mirror comprises either an electromagnetic MEMS mirror or a movable mirror combined with a mechanical element.

The embodiments of the present invention have been described above with reference to the drawings, but the present invention is not limited to these embodiments, and can variously be modified or altered without departing from the scope.

In the above embodiments, the movable mirror is attitude-controlled in accordance with the intensity of light, but the movable mirror may be attitude-controlled in accordance with the quantity of light, which is equal to the time integral of the intensity of light.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An optical deflection device comprising:

an optical deflector including an optical deflection surface, whose attitude is controllable, to deflect a light beam;

a driver, which drives the optical deflector;

control means for generating a control signal to control the driver;

a light intensity detector, which outputs a light intensity signal corresponding to light intensity of the light beam deflected by the optical deflector;

light intensity monitoring means for monitoring a change with time of the light intensity signal output from the light intensity detector to output information on the change as a light intensity monitor signal; and control signal monitoring means for monitoring a change with time of the control signal output from the control means to output information on the change as a control signal monitor signal, the control means generating the control signal to increase the output signal from the light intensity detector based on the light intensity monitor signal and control signal monitor signal;

wherein the control signal monitoring means comprises:

two control signal holding sections, which hold the control signals at two different times; and a control signal comparison section, which compares the two control signals held by the control signal holding section to output the information concerning increases/decreases of the control signals as the control signal monitor signal, and the light intensity monitoring means comprises:

two light intensity signal holding sections, which hold two light intensity signals at two different times; and a light intensity signal comparison section, which compares the two light intensity signals held by the light intensity signal holding section to output the information concerning increases/decreases of the light intensity signal as the light intensity monitor signal.

2. The optical deflection device according to claim 1, wherein the control means comprises:
   a judgment signal output section, which outputs information indicating whether to maintain or reverse the increase/decrease of the control signal as a judgment signal based on the control signal monitor signal and light intensity monitor signal; and
   a control signal update section, which generates the control signal based on the judgment signal.

3. The optical deflection device according to claim 2, wherein the control signal update section comprises:
   a signal holding section, which holds a latest control signal;
   an increase/decrease signal generation section, which generates an increase/decrease signal indicating an increase/decrease amount of the control signal; and
   a calculation section, which adds or subtracts the latest control signal output from the signal holding section and the increase/decrease signal output from the increase/decrease signal generation section based on the judgment signal output from the judgment signal output section.

4. An optical switch comprising:
   an input optical fiber;
   output optical fibers;
   an optical deflector including an optical deflection surface, whose attitude is controllable, to direct a light beam projected from the input optical fiber to one of the output optical fibers;
   a driver, which drives the optical deflector;
   control means for generating a control signal to control the driver;
   light intensity detectors, which output light intensity signals corresponding to light intensities of the light beams coupled with the output optical fibers;
   light intensity monitoring means for monitoring changes with time of the light intensity signals output from the light intensity detectors to output information on the changes as a light intensity monitor signal; and
   control signal monitoring means for monitoring a change with time of the control signal output from the control means to output information on the change as a control signal monitor signal,
   the control means generating the control signal to increase output signals from the light intensity detectors based on the light intensity monitor signal and control signal monitor signal;
   wherein the control signal monitoring means comprises:
   two control signal holding sections, which hold the control signals at two different times; and
   a control signal comparison section, which compares the two control signals held by the control signal holding section to output the information concerning increases/decreases of the control signals as the control signal monitor signal, and
   the light intensity monitoring means comprises:
   two light intensity signal holding sections, which hold two light intensity signals at two different times; and
   a light intensity signal comparison section, which compares the two light intensity signals held by the light intensity signal holding section to output the information concerning increases/decreases of the light intensity signal as the light intensity monitor signal.

5. A control method of an optical deflection surface, comprising:
   generating a control signal to control the optical deflection surface to deflect a light beam in a target attitude;
   continuing to detect light intensity of the light beam deflected by the optical deflection surface;
   continuing to change the control signal so as to increase the light intensity based on a change of the light intensity in response to the change of the control signal;
   increasing/decreasing the control signal;
   maintaining the increase/decrease of the control signal when the light intensity increases in response to the increase/decrease of the control signal; and
   reversing the increase/decrease of the control signal when the light intensity decreases in response to the increase/decrease of the control signal.

6. An optical deflection device comprising:
   a movable mirror including a mirror portion, whose attitude is controllable, to deflect a light beam;
   a driver, which drives the movable mirror;
   a control circuit, which generates a control signal to control the driver;
   a light intensity detector, which outputs a light intensity signal corresponding to light intensity of the light beam deflected by the movable mirror;
   a light intensity monitor circuit, which monitors a change with time of the light intensity signal output from the light intensity detector to output information on the change as a light intensity monitor signal; and
   a control signal monitor circuit, which monitors a change with time of the control signal output from the control circuit to output information on the change as a control signal monitor signal,
   the control circuit generating the control signal to increase the output signal from the light intensity detector based on the light intensity monitor signal and control signal monitor signal;
   wherein the control signal monitor circuit comprises:
   two control-signal-storing memories, which hold the control signals at two different times; and
   a subtraction circuit for the control signal, which compares two control signals held by the control-signal-storing memories to output the information concerning increases/decreases of the control signals as the control signal monitor signal, and
   the light intensity monitor circuit comprises:
   two light-intensity-signal-storing memories for the light intensity signals, which hold two light intensity signals at two different times; and
   a subtraction circuit for the light intensity signals, which compares the two light intensity signals held by the light-intensity-signal-storing memories to output the information concerning increases/decreases of the light intensity signal as the light intensity monitor signal.

7. The optical deflection device according to claim 6, wherein the control circuit comprises:
   a logic circuit, which outputs information indicating whether to maintain or reverse the increase/decrease of the control signal as a judgment signal based on the control signal monitor signal and light intensity monitor signal; and
   a control signal update section, which generates the control signal based on the judgment signal.

8. The optical deflection device according to claim 7, wherein the control signal update section comprises:
   a signal holding circuit, which holds a latest control signal;
   a signal generator, which generates an increase/decrease signal indicating an increase/decrease amount of the control signal; and an addition/subtraction circuit, which adds or subtracts the latest control signal output from the signal holding circuit and the increase/decrease signal output from the signal generator based on the judgment signal output from the logic circuit.

9. An optical switch comprising:

an input optical fiber;

output optical fibers;

a movable mirror including a mirror portion, whose attitude is controllable, to direct a light beam projected from the input optical fiber to one of the output optical fibers;

a driver, which drives the movable mirror;

a control circuit, which generates a control signal to control the driver;

light intensity detectors, which output light intensity signals corresponding to light intensities of the light beams coupled with the output optical fibers;

a light intensity monitor circuit, which monitors changes with time of the light intensity signals output from the light intensity detectors to output information on the changes as a light intensity monitor signal; and a control signal monitor circuit, which monitors a change with time of the control signal output from the control circuit to output information on the change as a control signal monitor signal, the control circuit generating the control signal to increase output signals from the light intensity detectors based on the light intensity monitor signal and control signal monitor signal;

wherein the control signal monitor circuit comprises:

two control-signal-storing memories, which hold the control signals at two different times; and a subtraction circuit for the control signal, which compares two control signals held by the control-signal-storing memories to output the information concerning increases/decreases of the control signals as the control signal monitor signal, and the light intensity monitor circuit comprises:

two light-intensity-signal-storing memories for the light intensity signals, which hold two light intensity signals at two different times; and a subtraction circuit for the light intensity signals, which compares the two light intensity signals held by the light-intensity-signal-storing memories to output the information concerning increases/decreases of the light intensity signal as the light intensity monitor signal.

* * * * *